US011944213B1

(12) United States Patent
Ondrasik, Jr.

(10) Patent No.: US 11,944,213 B1
(45) Date of Patent: Apr. 2, 2024

(54) SHELVING RACK WITH MOVEABLE DIVIDERS AND LOCKING FRONT BAR

(71) Applicant: THE ONDRASIK FAMILY TRUST DATED 11/3/1999, Commerce, CA (US)

(72) Inventor: V. John Ondrasik, Jr., Granada Hills, CA (US)

(73) Assignee: THE ONDRASIK FAMILY TRUST DATED 11/3/1999, Commerce, CA (US), PART INTEREST ( * ) Notice: Subject to any disclaimer, the term of this patent is extended or adjusted under 35 U.S.C. 154(b) by 0 days.

(21) Appl. No.: 18/524,827

(22) Filed: Nov. 30, 2023

(51) Int. Cl.
*A47F 5/00* (2006.01)
*A47F 1/12* (2006.01)
*E05B 73/00* (2006.01)
*A47B 73/00* (2006.01)
*A47F 7/28* (2006.01)

(52) U.S. Cl.
CPC ............ *A47F 5/0056* (2013.01); *A47F 1/121* (2013.01); *E05B 73/00* (2013.01); *E05B 73/0023* (2013.01); *A47B 73/002* (2013.01); *A47F 7/28* (2013.01); *E05B 73/0041* (2013.01); *E05B 73/0047* (2013.01)

(58) Field of Classification Search
CPC .. A47F 1/121; A47F 1/12; A47F 1/125; A47F 1/126; A47F 7/28; A47F 5/005; A47F 5/0056; A47B 73/00; A47B 73/002; E05B 73/00; E05B 73/0023; E05B 73/0041; E05B 73/0047
See application file for complete search history.

(56) References Cited

U.S. PATENT DOCUMENTS 2,933,195 A * 4/1960 Radek .................... A47B 57/58 248/220.42
3,015,399 A * 1/1962 Radek ........................ A47F 5/01 211/184
3,110,402 A * 11/1963 Mogulescu ............. A47F 1/126 211/59.3
3,149,729 A * 9/1964 Smith ........................ A47F 5/01 211/126.9
3,194,528 A * 7/1965 Chesley ............... A47B 96/028 211/184
3,385,451 A * 5/1968 Anderson ............. A47F 7/0021 211/184
3,501,020 A * 3/1970 Krikorian ............... A47F 5/005 211/184
(Continued)

*Primary Examiner* — Devin K Barnett
(74) *Attorney, Agent, or Firm* — David R. Heckadon; Gordon Rees Scully Mansukhani LLP

(57) ABSTRACT

A shelving rack system with a wireframe base and at least one wireframe divider having a rear hook that is received into an aperture on a rear support and a front leg that is received down into an aperture on a front support. The divider is locked into position by first pulling the divider forwards such that the rear hook locks in position and then rotating the divider downwards such that front leg locks into position. Next, a front stop bar is inserted through aligned apertures on a front bracket on the divider, a locking column on one side of the wireframe base and a side support column on an opposite side of the wireframe base. Finally, a fastening pin is inserted down into the locking column to secure the front stop bar into a locked position.

11 Claims, 9 Drawing Sheets

(56) References Cited

U.S. PATENT DOCUMENTS

| | | | | | |
|---|---|---|---|---|---|
| 3,608,741 | A * | 9/1971 | Schray | A47F 5/005 | 211/184 |
| 4,036,366 | A * | 7/1977 | Dixon | A22C 15/007 | 211/124 |
| 4,190,167 | A * | 2/1980 | Wells | A47F 5/005 | 211/184 |
| RE30,706 | E * | 8/1981 | Bustos | A47F 1/12 | 211/59.2 |
| 4,346,806 | A * | 8/1982 | Bustos | A47F 5/005 | 211/184 |
| 4,359,947 | A * | 11/1982 | Marschak | A47B 57/04 | 211/186 |
| 4,562,927 | A * | 1/1986 | Fredrickson | G09F 15/00 | 312/257.1 |
| 4,872,567 | A * | 10/1989 | Bustos | A47B 96/00 | 211/175 |
| 5,119,945 | A * | 6/1992 | Wiggins | A47F 5/0056 | 211/90.03 |
| 5,205,421 | A * | 4/1993 | Bustos | A47F 5/005 | 211/175 |
| 5,450,971 | A * | 9/1995 | Boron | A47F 5/12 | 211/175 |
| 5,520,291 | A * | 5/1996 | Graham | A47B 81/005 | 211/70.5 |
| 6,116,436 | A * | 9/2000 | Ferrucci | G11B 33/0444 | |
| 6,302,036 | B1 * | 10/2001 | Carson | A47F 5/0031 | 211/175 |
| 6,526,897 | B1 * | 3/2003 | Ondrasik | A47B 57/20 | 108/107 |
| 6,767,234 | B1 * | 7/2004 | Rosa | A47F 11/10 | 439/327 |
| 7,104,094 | B2 * | 9/2006 | Zadak | A47F 5/0861 | 70/57 |
| 9,351,590 | B1 * | 5/2016 | Wildrick | A47B 57/588 | |
| 10,405,673 | B1 * | 9/2019 | Ondrasik | A47F 7/28 | |
| 10,463,172 | B1 * | 11/2019 | Ondrasik | A47B 57/588 | |
| 10,660,435 | B2 * | 5/2020 | Miller, Jr. | F25D 25/02 | |
| 2001/0045403 | A1 * | 11/2001 | Robertson | A47F 1/12 | 211/74 |
| 2002/0033373 | A1 * | 3/2002 | Robertson | A47F 7/28 | 211/74 |
| 2004/0011754 | A1 * | 1/2004 | Zadak | A47B 57/588 | 211/175 |
| 2008/0314846 | A1 * | 12/2008 | Klein | A47J 47/16 | 211/41.11 |
| 2010/0200526 | A1 * | 8/2010 | Barkdoll | A47F 1/126 | 211/183 |
| 2012/0217212 | A1 * | 8/2012 | Czalkiewicz | A47F 1/12 | 211/59.2 |
| 2014/0217042 | A1 * | 8/2014 | Hardy | A47F 7/0014 | 29/428 |
| 2014/0319087 | A1 * | 10/2014 | Sosso | A47F 1/126 | 211/59.3 |
| 2015/0023727 | A1 * | 1/2015 | Williams | F16B 2/08 | 403/188 |
| 2015/0114918 | A1 * | 4/2015 | Nickell | B65G 13/11 | 211/59.2 |
| 2021/0339910 | A1 * | 11/2021 | Schuldt | A47F 5/005 | |
| 2022/0007855 | A1 * | 1/2022 | Roberts | A47B 57/581 | |

* cited by examiner

SHELVING RACK WITH MOVEABLE DIVIDERS AND LOCKING FRONT BAR

TECHNICAL FIELD

The present system relates to wire shelving units for dispensing beverages, food products and other items.

BACKGROUND OF THE INVENTION

The present inventors have previously developed wireframe shelving systems for dispensing beverages and food products from refrigerated store cabinets. Examples of such systems are seen in U.S. Pat. Nos. 10,463,172 and 10,405,673, both entitled "Shelving Rack Having Bottom Support Panel with Moveable Dividers".

Although these existing systems have proven to be excellent in operation, the Applicants desire to provide wireframe shelving units having additional non-obvious features and modifications, including for example, faster and easier locking of the wireframe divider into position, and providing an adjustable-height front stop bar. As will be shown herein, the present system provides such an improved system with such advantages, and provides additional benefits.

SUMMARY OF THE INVENTION

In preferred aspects, the present system provides a shelving rack system, comprising: a wireframe base; a front divider support extending across a width of the wireframe base; a rear divider support extending across a width of the wireframe base; a wireframe divider that comprises: a front bottom projection receivable into one of a series of apertures in the front divider support, a rear bottom projection receivable into one of a series of apertures in the rear divider support, and a front bracket having at least one aperture passing therethrough; a front stop bar passing through the aperture in the front bracket of the wireframe divider; a locking column at a front of the wireframe base, wherein the front stop bar passes through an aperture in the locking column, and a fastening pin securing the front stop bar within the locking column.

In operation, the wireframe divider is positioned and then locked into position by first pulling the divider forwards such that the rear hook locks in position in the rear divider support. Next, the wireframe divider is rotated downwardly such that its front leg locks into position. This locking motion is both quick and easy for the operator standing at the front of the shelving unit. As such, the operator does not need to fumble around with structures in the back of the shelving rack system. Rather, the positioning and re-positioning and locking of the divider can be done while only holding onto the front portions of the wireframe divider. Next, after the wireframe divider has been positioned, a front stop bar is inserted through aligned apertures on a front bracket on the wireframe divider(s), the locking column on one front side of the wireframe base and a side support column on an opposite front side of the wireframe base. Finally, a fastening pin can be inserted downwardly into the locking column to secure the front stop bar into a locked position. Advantageously, the fastening pin holds the front stop bar in a locked position which in turn holds the wireframe divider in its locked position.

In preferred embodiments, the rear bottom projection on the wireframe divider is a hook that is simply pulled forwards to latch into one of the apertures in the rear divider support. Next, the front bottom projection (which is preferably a leg post) is inserted downwardly into one of the apertures in the front divider support after the hook has been pulled forwards to latch into one of the apertures of the rear divider support.

In preferred embodiments, the wireframe base also comprises a front panel, and the front bracket rests upon the front panel after the front bottom projection has been inserted down into one of the apertures in the front divider support.

In operation, the wireframe divider is moveable across a width of the wireframe base by simply repositioning the front and rear bottom projections within various apertures in the front and rear divider supports. It is to be understood that although only one wireframe divider is described herein, multiple wireframe dividers can be positioned in parallel across the surface of the wireframe base within the present shelving rack.

In preferred aspects, the locking column has a pair of apertures to receive the fastening pin therethrough, and the fastening pin also passes vertically down through an aperture in the front stop bar. Also in preferred aspects, the locking column has a series of apertures passing therethrough that align with a series of apertures in the front bracket of the wireframe divider. A plurality of apertures at the same heights are preferably included on each of the wireframe divider's front bracket, and on a side support column positioned on an opposite front side of the wireframe shelf. As such, the front support bar can be positioned at different vertical heights as desired, or a plurality of different front support bars can be used simultaneously, each positioned at different heights.

In short, a first advantage of the present system is that the front stop bar can be positioned at an adjustable height (such that different heights may be used to dispense beverages or other products of different heights). A second advantage of the present system is that it provides a compact, convenient and easy to use system for locking the front stop bar into position. A third advantage of the present system is that it can provide multiple front stop bars at different heights as desired. A fourth advantage of the present system is that it provides a novel locking system for positioning the rear end of the divider into a locked position quickly and easily. Lastly, all of this can be done by an operator standing at the front of the shelving unit, without having to reach far back into the shelving unit.

DETAILED DESCRIPTION OF THE DRAWINGS

Figure 1:
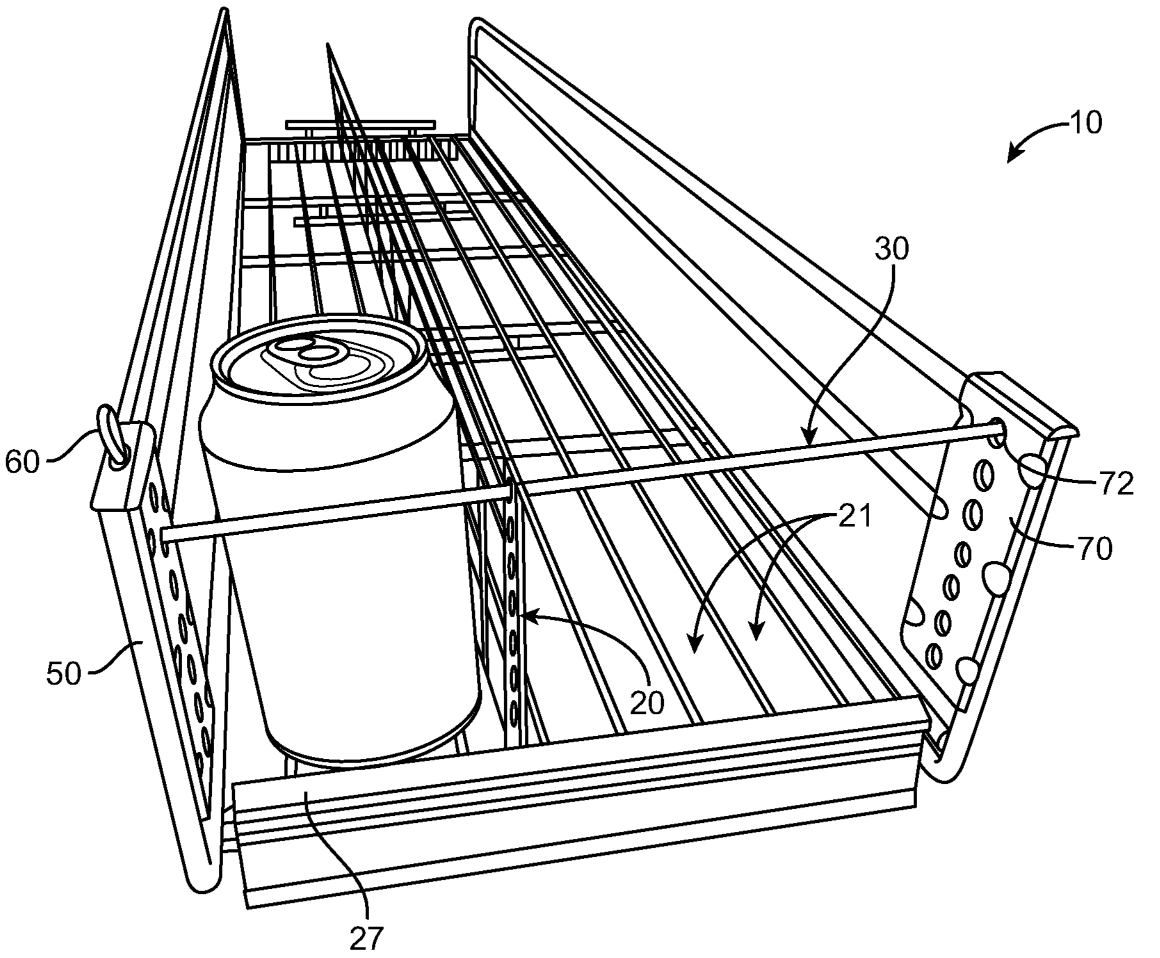
FIG. 1 is a front perspective view of the wireframe shelving rack, using one front stop bar.
Figure 2:
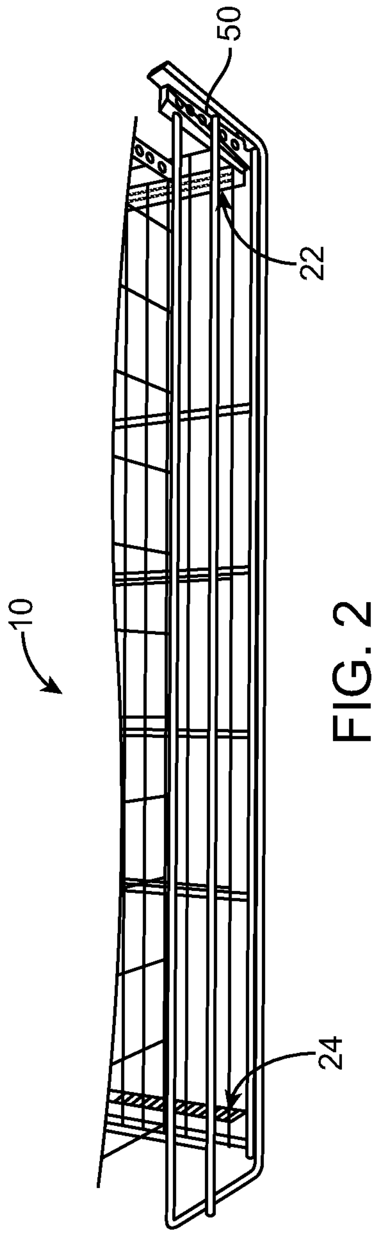
FIG. 2 is a top perspective view of the present wireframe shelving rack, with the wireframe divider removed.
Figure 3:
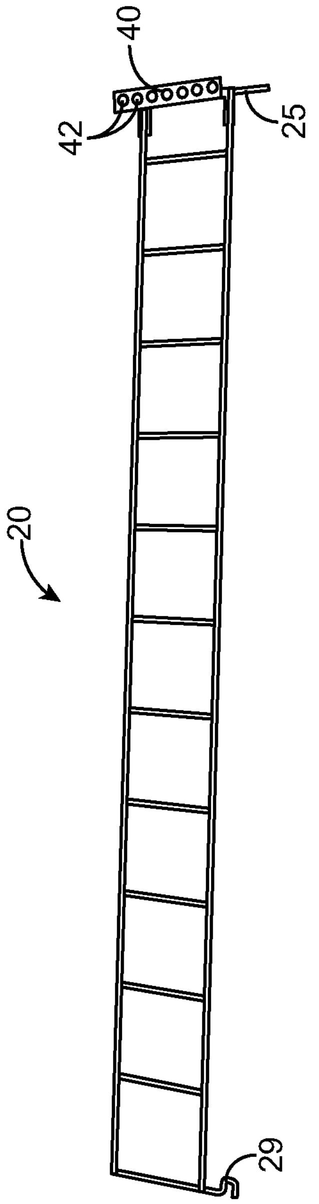
FIG. 3 is a side elevation view of one of the dividers.

FIG. 1 is a front perspective view of the wireframe shelving rack 10, having a moveable (side-to-side) wireframe divider 20 with one front stop bar 30. FIG. 2 is a top perspective view of the present wireframe shelving rack 10, with the wireframe divider removed. FIG. 3 is a side elevation view of one of the wireframe dividers 20.

As seen in the attached Figures, the present system provides a shelving rack system 10, comprising: a wireframe base 21; a front divider support 22 extending across a width of wireframe base 21; a rear divider support 24 extending across a width of wireframe base 21; and a wireframe divider 20.

In preferred aspects, the wireframe divider 20, includes: a front bottom projection 25 receivable into one of a series of apertures 23 in the front divider support 22, a rear bottom projection 29 receivable into one of a series of apertures 26 in the rear divider support 24, and a front bracket 40 having at least one aperture 42 passing therethrough.

The front stop bar 30 passes through the aperture 42 in front bracket 40 of wireframe divider 20. A locking column 50 is also provided at a front of wireframe base 21. As can be seen, front stop bar 30 passes though one of the apertures 52 in locking column 50. Finally, a fastening pin 60 secures the front stop bar 30 within the locking column 50.

Figure 4:
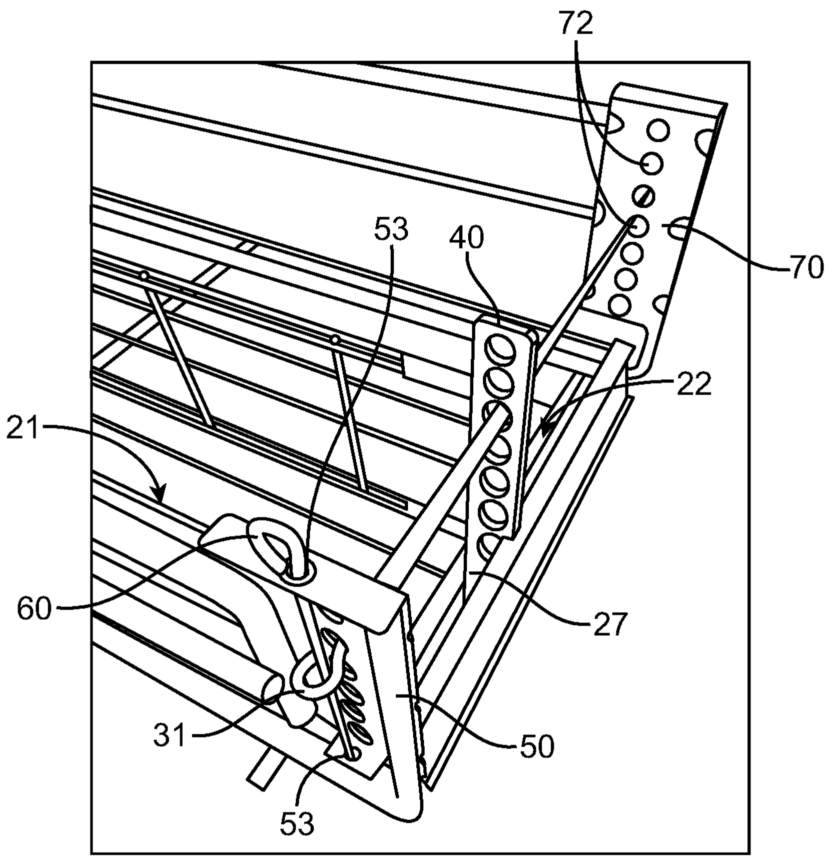
FIG. 4 is a front perspective view of the present wireframe shelving rack, showing operation of the locking column.
Figure 5:
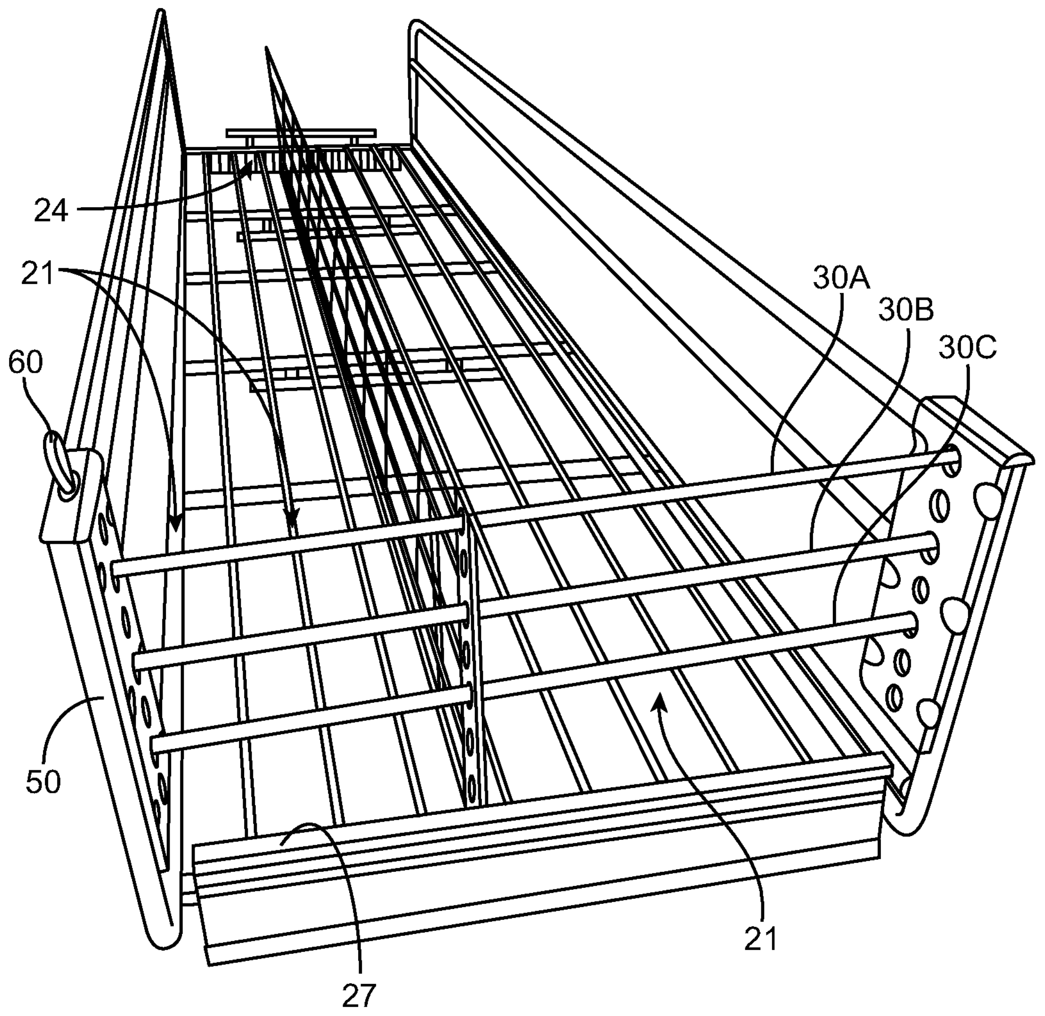
FIG. 5 is a front perspective view of the present wireframe shelving rack, instead using a plurality of front stop bars.
Figure 6:
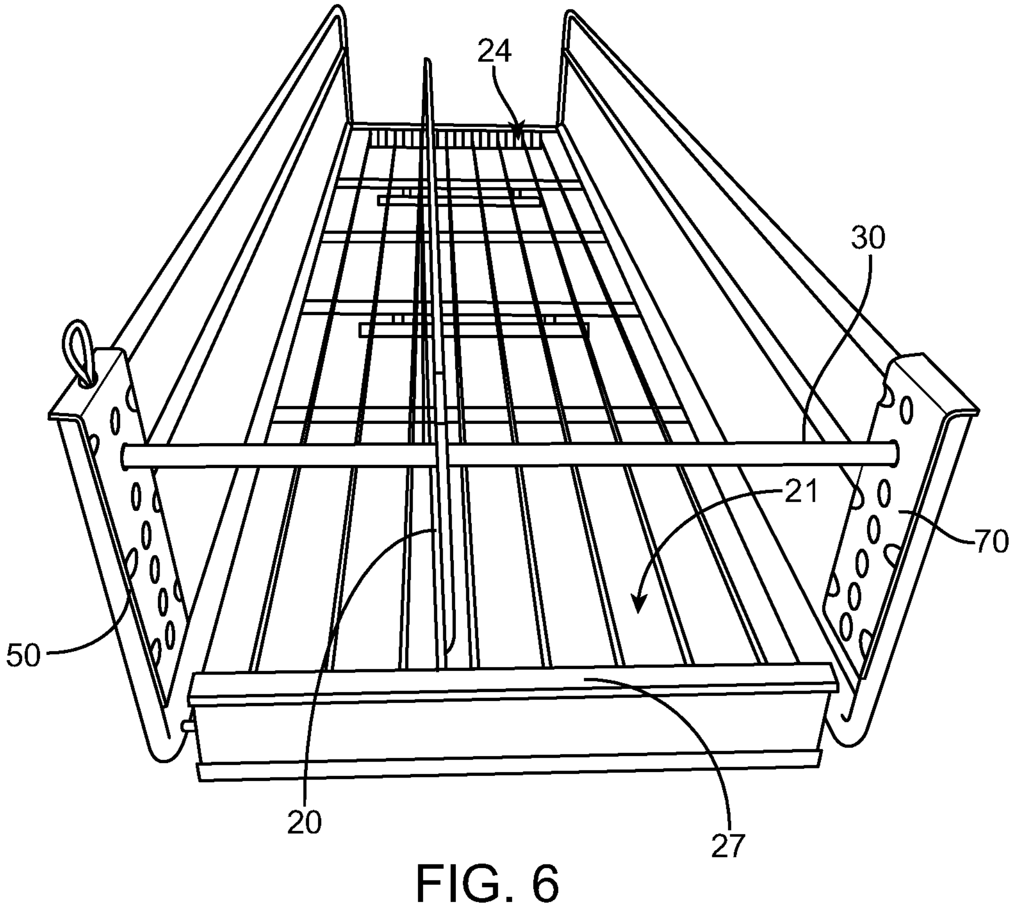
FIG. 6 is a front perspective view of the wireframe shelving rack, using a somewhat larger diameter front support bar.
Figure 7:
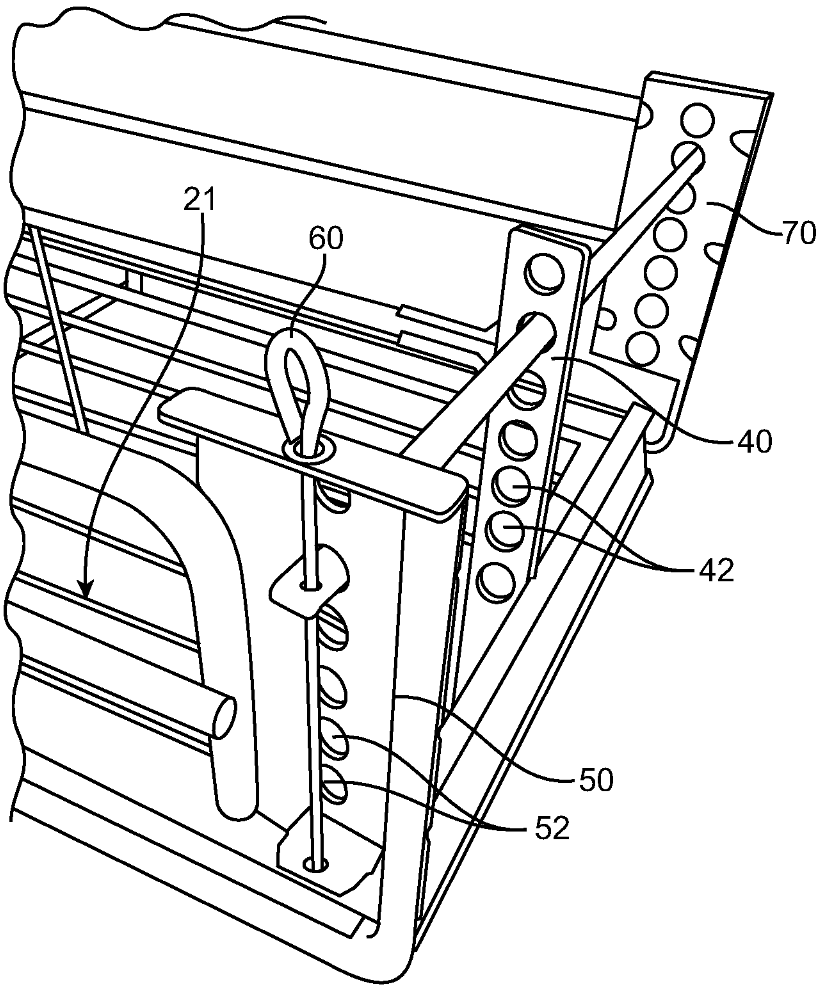
FIG. 7 is a front perspective view of the present wireframe shelving rack, showing operation of the locking column with the larger diameter front support bar of FIG. 6.

FIG. 4 is a front perspective view of the present wireframe shelving rack, showing operation of the locking column 50. Specifically, fastening pin 60 is simply inserted vertically downwards through top and bottom apertures 53 in locking column 50, while also passing through an aperture 31 in front stop bar 30. Next, FIG. 5 is a front perspective view of the present wireframe shelving rack 10, instead using a plurality of front stop bars 30A, 30B and 30C. In this embodiment, each of the three front stop bars 30A, 30B and 30C can all be locked into position by downwardly inserted fastening pin 60. FIG. 6 is a front perspective view of the wireframe shelving rack, using a somewhat larger diameter front support bar 30 (as compared to the front support bars 30A, 30B and 30C in FIG. 4). FIG. 7 illustrates operation of the present locking column 50.

Figure 8:
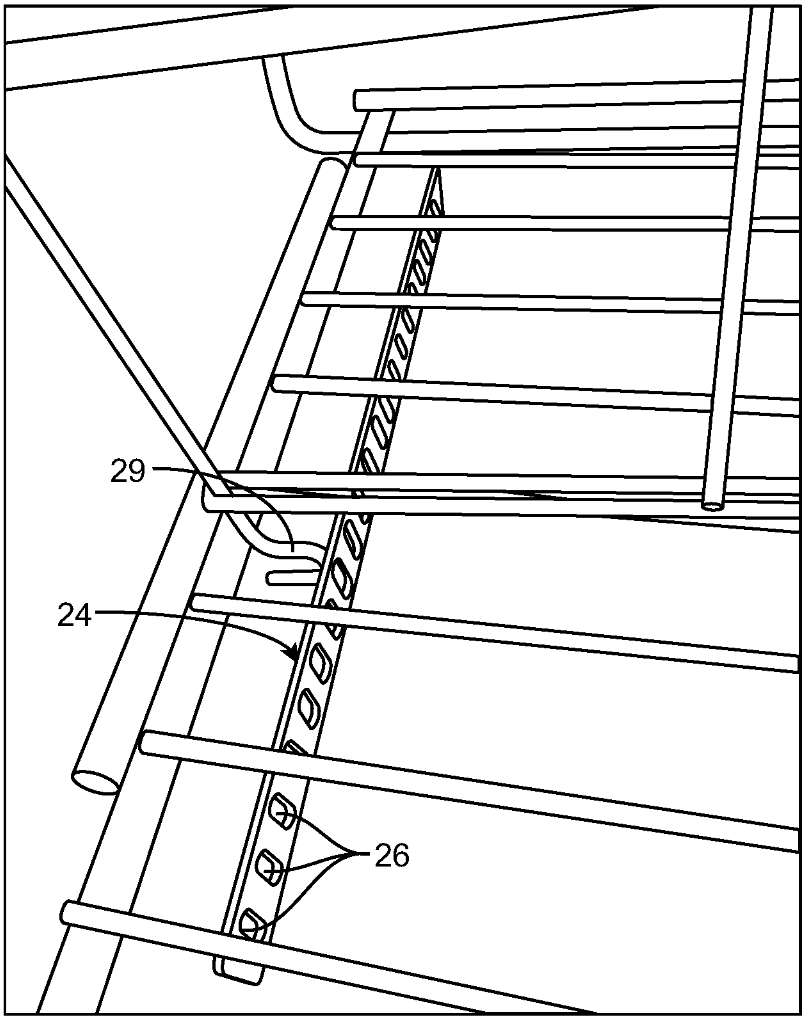
FIG. 8 is a perspective view of the rear area of the present wireframe shelving rack, showing the rear bottom projection (e.g.: a hook) on the divider about to be positioned in one of the apertures of the rear divider support.
Figure 9:
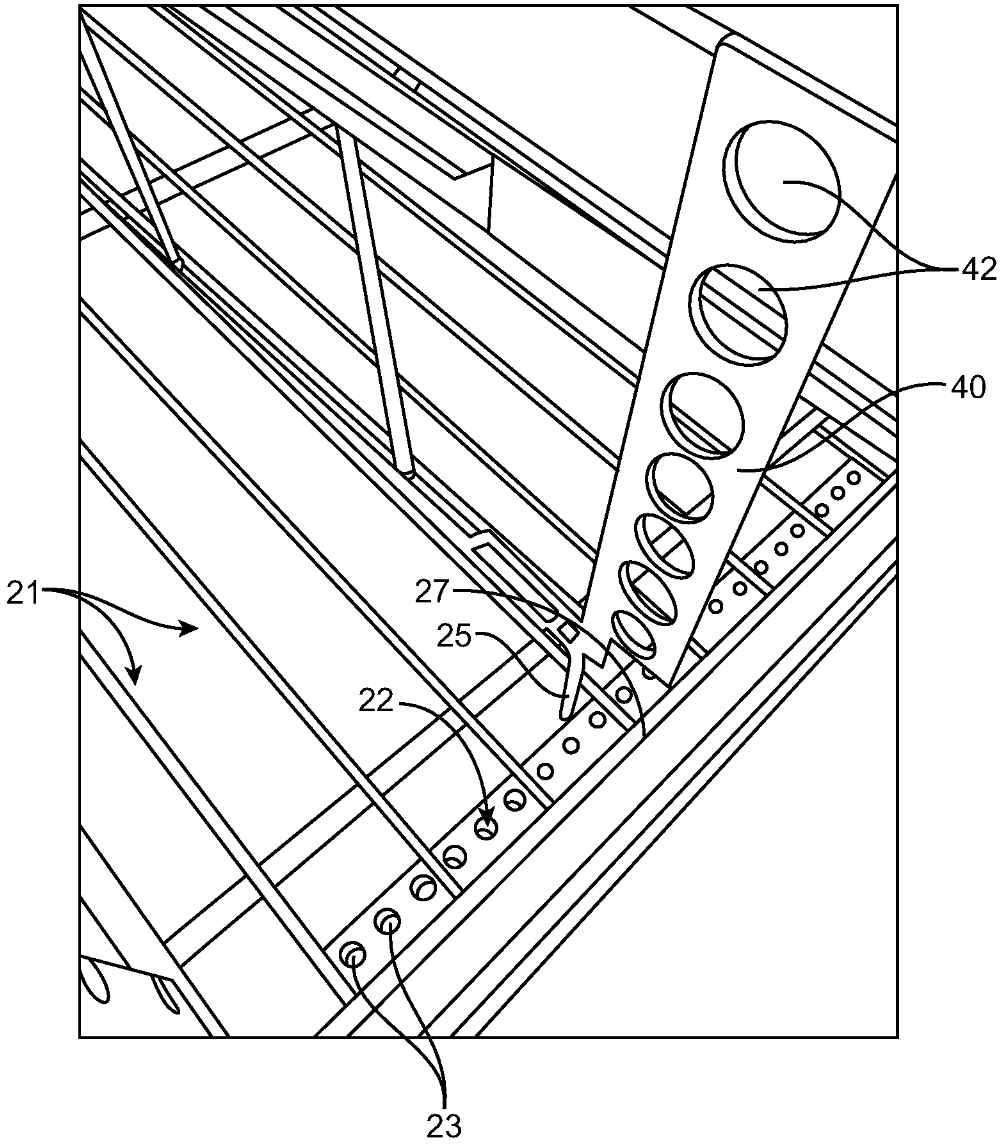
FIG. 9 is a perspective view of the front area of the present wireframe shelving rack, showing the front bottom projection (e.g.: a leg post) on the divider about to be positioned in one of the apertures of the front divider support.
Figure 10:
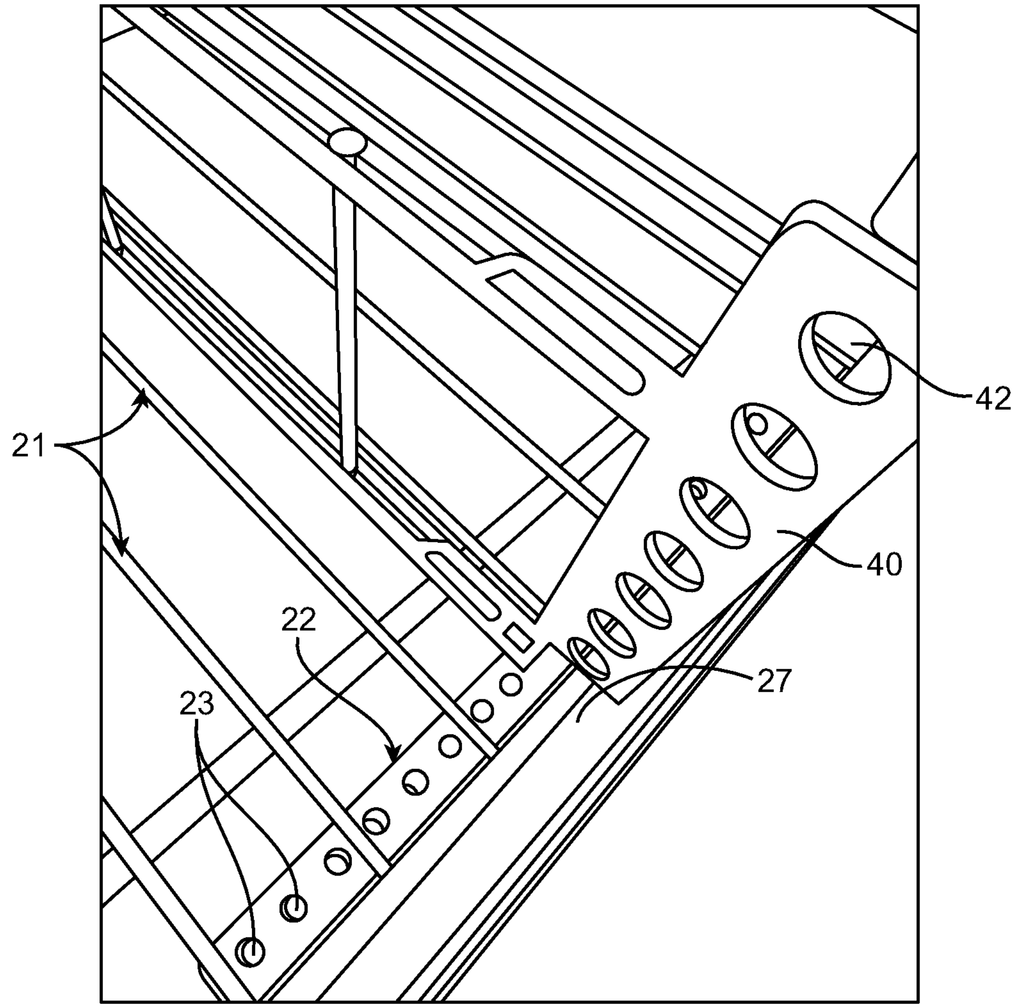
FIG. 10 is a perspective view of the front area of the present wireframe shelving rack, showing the front bottom projection (e.g.: leg) on the divider after it has been positioned in one of the apertures of the front divider support, with the front bracket of the wireframe divider positioned on top of a front panel of the wireframe shelving rack.

The easy and rapid locking feature of the present system is best understood by viewing FIGS. 8, 9 and 10 in sequence, as follows. First, in FIG. 8 (which shows a rear portion of the wireframe shelf), the operator is about to insert hook 29 into one of the apertures 26 in rear divider support 24. As can be appreciated, having the apertures 26 positioned generally vertical as shown enables hook 29 to be quickly inserted into one of these apertures, and then pulled forwards, thereby securing hook 29 into one of apertures 26. Next, as seen in FIG. 9, wireframe divider 20 is pulled forwards (to then position front bottom projection (e.g.: leg 25) on the wireframe divider 20 downwardly into one of the apertures 23 of front divider support 22. Lastly, FIG. 10 shows the front bottom projection (leg 25) after it has been positioned down into one of the apertures 23 of front divider support 22. At this time, the position of leg 25 within aperture 23 will prevent hook 29 from coming loose from its position within aperture 26. Thus, the wireframe divider 20 will be locked into position. In addition, as can also be seen in FIG. 10, the front bracket 40 of wireframe divider 20 is preferably positioned to rest on top of a front panel 27 of wireframe shelving rack 10.

As can be seen in FIGS. 1, 4 and 7, a side support column 70 is preferably positioned on an opposite front side of the wireframe base from locking column 60. Side support column 70 preferably also has a series of apertures 72 passing therethrough. In preferred aspects, apertures 72, 42 and 52 are all aligned with one another. Therefore, once hook 29 has been locked forward into one of apertures 26, followed by leg 25 locked down into one of apertures 23, front support bar 30 can then be passed through apertures 72, 42 and 52 (thereby preventing leg 25 from being lifted out of its selected aperture 23). Finally, by inserting fastening pin 60 down into locking column 50, front stop bar(s) 30 can itself be secured into a locked position.

To move wireframe divider to a new position (for example when dispensing a new beverage or product of a different width), fastening pin 60 is removed, followed by front stop bar 30 being removed, followed by lifting the front end of wireframe divider 20 such that leg 25 is removed from its selected aperture 23 so that the wireframe divider 20 can be gently slid backwards to remove hook 29 from aperture 26, thus freeing the wireframe divider. A new position is then selected for the wireframe divider with rear hook 29 inserted into a new rear aperture 26, followed by leg 25 lowered into a new aperture 23. Once again, re-inserting front stop bar 30 through apertures 52, 42 and 72 will again lock the wireframe divider 20 into its new position, and then fastening pin 60 then prevents front stop bar 30 from moving.

In optional embodiments, a support panel (not shown) may be positioned on top of the wireframe base, having holes through which hook 29 and leg 25 may be inserted through down into rear divider support 24 and front divider support 22, respectively. In other optional embodiments, a back support (such as a bar or one or more wires) may span across the back of the shelving rack, thereby providing a back support to beverages and food products sitting in the shelving rack.

What is claimed is:

1. A shelving rack system, comprising:

a wireframe base;

a front divider support extending across a width of the wireframe base;

a rear divider support extending across a width of the wireframe base;

a wireframe divider, wherein the wireframe divider comprises:

a front bottom projection receivable into one of a series of apertures in the front divider support, a rear bottom projection receivable into one of a series of apertures in the rear divider support, and a front bracket having at least one aperture therethrough;

a front stop bar that passes through the at least one aperture in the front bracket of the wireframe divider;

a locking column at a front of the wireframe base, wherein the front stop bar passes through an aperture in the locking column, and a fastening pin configured to secure the front stop bar within the locking column.

2. The shelving rack system of claim 1, wherein the rear bottom projection on the wireframe divider is a hook.

3. The shelving rack of claim 2, wherein the hook is configured to be pulled forwards to latch into one of the apertures in the rear divider support.

4. The shelving rack of claim 3, wherein the front bottom projection is configured to be inserted down into one of the apertures in the front divider support after the hook has been pulled forwards to latch into one of the apertures of the rear divider support.

5. The shelving rack of claim 1, wherein the wireframe base further comprises a front panel, and wherein the front bracket is configured to rest upon the front panel when the front bottom projection is inserted down into one of the apertures in the front divider support.

6. The shelving rack of claim 1, wherein the wireframe divider is moveable across a width of the wireframe base by repositioning the front and rear bottom projections within various apertures from said series of apertures in the front and rear divider supports.

7. The shelving rack of claim 1, wherein the locking column has a pair of apertures to receive the fastening pin therethrough, and wherein the fastening pin also passes through an aperture in the front stop bar.

8. The shelving rack of claim 7, wherein fastening pin is configured to be inserted vertically down into the locking column.

9. The shelving rack of claim 1, wherein the locking column has a series of apertures passing therethrough that align with a series of apertures from the at least one aperture of the front bracket.

10. The shelving rack of claim 9, further comprising:

a side support column positioned on an opposite front side of the wireframe base from the locking column, the side support column having a series of apertures passing therethrough that align both with the series of apertures in the front bracket and with the series of apertures in the locking column.

11. The shelving rack of claim 10, wherein the front stop bar passes through a corresponding aperture in each of the locking column, the front bracket in the wireframe divider and the side support column respectively.

* * * * *